Figure 1:
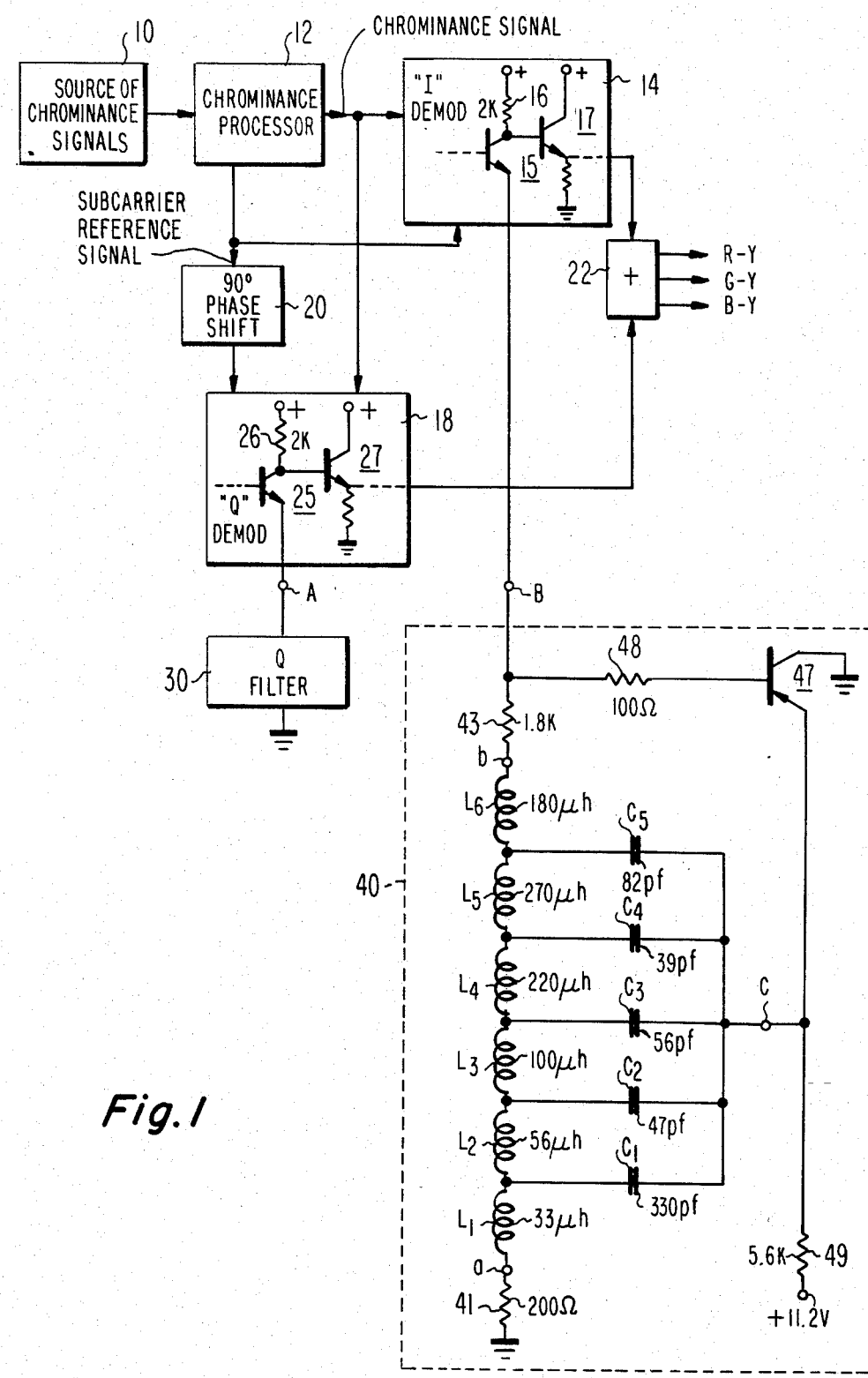

United States Patent [19]

Murphy, III et al.

[11] Patent Number: 4,536,787
[45] Date of Patent: Aug. 20, 1985

[54] DEMODULATED CHROMINANCE SIGNAL FILTER WITH PEAKED RESPONSE

[75] Inventors: Wesley W. Murphy, III; Saiprasad V. Naimpally, both of Indianapolis, Ind.

[73] Assignee: RCA Corporation, Princeton, N.J.

[21] Appl. No.: 489,302

[22] Filed: Apr. 28, 1983

[51] Int. Cl.³ .......................................... H04N 9/535
[52] U.S. Cl. .................................................... 358/38
[58] Field of Search ...................... 358/38, 40, 166, 37

[56] References Cited

U.S. PATENT DOCUMENTS 2,816,952 12/1957 Lockhart .
2,831,919 4/1958 Lockhart .
2,908,752 10/1959 Lockhart .
3,852,523 12/1974 Humphrey ............................ 358/38

OTHER PUBLICATIONS

Copending U.S. patent application Ser. No. 470,618 of W. E. Sepp, titled "High Order Electrical Signal Filters".

Copending U.S. patent application Ser. No. 488,813 of S. V. Naimpally, titled "Demodulated Chrominance Signal Filter Using Impedance Mismatched Sections."

Primary Examiner—Richard Murray
Attorney, Agent, or Firm—P. J. Rasmussen; P. M. Emanuel; R. H. Kurdyla

[57] ABSTRACT

A filter network suitable for processing a signal such as the demodulated "I" chrominance component of a composite color television signal is disclosed. The filter network comprises plural cascaded mutually interactive resonant LC sections for providing wideband filtering, amplitude peaking over a prescribed range of signal frequencies, and signal delay. Mismatched resistors terminate the filter network and constitute the primary DC impedance of the filter network, and the LC sections exhibit selected impedances at frequencies within the peaking frequency range.

20 Claims, 2 Drawing Figures

DEMODULATED CHROMINANCE SIGNAL FILTER WITH PEAKED RESPONSE

This invention concerns a composite electrical signal filter suitable for processing a signal such as the demodulated "I" chrominance information signal component of a color television signal.

In accordance with the NTSC television signal broadcast standards adopted in the United States, the chrominance component of a composite broadcast color television signal is formed by encoding a pair of color difference signals as the modulation of a pair of chrominance subcarrier signals, where the subcarrier signals exhibit the same frequency but a mutually quadrature (90°) phase relationship. At the color television signal receiver, the pair of color difference signals must be separated or demodulated from the composite color signal. Thereafter, the separated color components are matrixed with the separated luminance component of the composite color television signal to form the drive signals for the kinescope of the television receiver.

One of the color difference signal components, commonly referred to as the "Q" signal, is transmitted as a double sideband, relatively narrow band signal of approximately 0–0.5 MHz bandwidth. The other color difference signal component, commonly referred to as the "I" signal, is transmitted as a relatively wide band signal of approximately 0–1.5 MHz bandwidth. In order to fit the I,Q encoded chrominance signal within the allocated 6 MHz modulated video signal bandwidth, the upper sideband of the I signal is eliminated prior to transmission. The transmitted I signal component thus contains double sideband information over a 0–0.5 MHz bandwidth, and single sideband information over a 0.5–1.5 MHz bandwidth.

The method of transmitting the I signal using both single and double sideband information is an efficient way of utilizing the frequency spectrum allocated for broadcast color television signals. However, the frequency spectrum energy associated with the single sideband information of the I signal is only one-half of what it would be if the I signal was fully double sidebanded. Therefore in the process of recovering the I signal at the receiver, it is necessary to compensate for the spectrum amplitude loss associated with the absence of one of the I signal sidebands. This can be accomplished by performing frequency selective signal peaking in the course of the I signal recovery process.

Circuits utilized to separate or demodulate the I and Q signals from the composite color signal can include I and Q synchronous demodulators, and associated I and Q signal filters. Delay compensation should be provided to assure that the filtered demodulated I and Q signals exhibit proper phase and timing synchronism when these signals are combined to develop plural red, green and blue color difference signals which are eventually matrixed with the luminance component of the composite color television signal to form the kinescope drive signals.

In accordance with the principles of the present invention, there is disclosed herein a filter network suitable for processing a signal such as a demodulated I chrominance component by providing a given signal delay, wideband signal filtering, and a peaked amplitude response over a given frequency range.

The disclosed filter comprises first and second cascaded resonant sections each comprising an inductance and a capacitance, and each being terminated by resistors which differ substantially in value. An intermediate resonant section comprising an inductance and capacitance is coupled between and in cascade with the first and second sections. The first and second resonant sections respectively exhibit impedances, at a frequency within the peaking frequency range, which approximate the value of the associated terminating resistor. In addition, the filter DC impedance is primarily determined by the values of the terminating resistors.

In accordance with a feature of the invention, the intermediate resonant section comprises plural cascaded inductance-capacitance resonant sections which respectively exhibit, at frequencies within the peaking frequency range, progressively increasing impedance values between the impedance values exhibited by the first and second resonant sections within the peaking frequency range.

In accordance with a further feature of the invention, the filter network comprises a high order, three-terminal composite filter coupled via a single interface terminal to a signal path conveying signals to be filtered.

Figure 2:
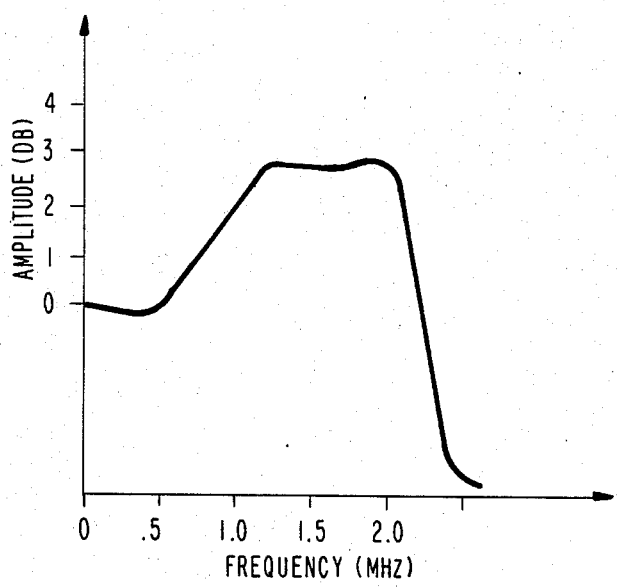

In the drawing:

FIG. 1 shows a portion of a color television receiver including a color signal demodulator network and an associated filter network according to the present invention; and FIG. 2 depicts the amplitude-versus-frequency response of the filter network according to the present invention.

In FIG. 1, chrominance information signals from a source 10 are applied to a chrominance signal processor 12, which includes chrominance gain control and phase control networks and various other signal processing circuits of a conventional nature, including a controlled local oscillator for regenerating a color subcarrier reference signal at a frequency of approximately 3.58 MHz. Processed chrominance information signals from processor 12 are applied to information signal inputs of an "I" phase chrominance signal demodulator 14 and a "Q" phase chrominance signal demodulator 18. A regenerated 3.58 MHz chrominance subcarrier reference signal from processor 12 is applied to a reference signal input of demodulator 14, and a mutually quadrature phased subcarrier reference signal is applied to a reference signal input of demodulator 18 via a 90° phase shifting network 20. After appropriate filtering as will be discussed, demodulated I and Q chrominance signal components from the outputs of demodulators 14 and 18 are combined in a matrix amplifier 22 for developing output R-Y, G-Y and B-Y color difference signals. These signals are ultimately combined with the luminance component of the composite color television signal to produce red, green and blue color image representative signals for application to a color image display device.

The signal path within I demodulator 14 includes a phase detector (a synchronous demodulator) and an output circuit for receiving demodulated signals. The output circuit is shown as including an amplifier transistor 15 with an associated collector output load resistor 16, and an emitter follower transistor 17. Functionally corresponding transistors 25, 27 and a load resistor 26 are included in the signal path of Q demodulator 18 for receiving demodulated Q signals. The emitter electrodes of transistors 25 and 15 are respectively coupled via interfacing terminals A and B to Q and I signal filter networks 30 and 40. When I and Q demodulators 14 and 18 are constructed in an integrated circuit device, terminals B and A correspond to external connecting terminals of the integrated circuit device.

In a color television signal processing system according to NTSC broadcast standards such as employed in the United States, the Q signal modulation component of the chrominance signal from processor 12 occupies an approximately 0.5 MHz bandwidth on both upper and lower sidebands with respect to the 3.58 MHz frequency of the chrominance subcarrier signal. Thus in the modulated chrominance frequency spectrum the Q chrominance information to be demodulated includes signal frequencies from 3.08 HMz to 4.08 MHz between the −3 db points. The quadrature phased I signal modulation component of the chrominance signal from processor 12 occupies an approximately 1.5 MHz bandwidth on a lower sideband relative to the chrominance subcarrier frequency, and occupies a 0.5 MHz bandwidth on an upper sideband relative to the chrominance subcarrier signal frequency. Thus in the modulated chrominance frequency spectrum the I chrominance information to be demodulated includes signal frequencies from 2.08 MHz to 4.08 MHz between the −3 db points.

Filtering of the demodulated I and Q signals is respectively accomplished by filter networks 40 and 30 to provide appropriate I and Q signal information to the inputs of matrix 22, and to eliminate unwanted signal frequencies such as harmonics of the 3.58 MHz chrominance subcarrier signal. Q signal filter 30 can comprise, for example, a high order low pass filter with a 0–0.5 MHz amplitude vs. frequency response characteristic between the −3 db points. Filter 30 can be of the type shown in a copending U.S. patent application of W. E. Sepp, Ser. No. 470,618 filed Feb. 28, 1983, titled "High Order Electrical Signal Filters", incorporated herein by reference.

I signal filter network 40 according to the present invention comprises an eleventh order composite LC filter including series connected inductors $L_1$–$L_6$ and associated shunt connected capacitors $C_1$–$C_5$. The configuration of the composite filter is that of a filter having three terminals (a,b,c) and two signal ports (a,b) between which the filter transfer function is developed.

The composite LC filter, which may be provided in encapsulated form, comprises a peaked high order low pass filter with an amplitude vs. frequency response characteristic (transfer function) as shown in FIG. 2. The composite filter exhibits significant attenuation above approximately 2 MHz for attenuating the 3.58 MHz subcarrier frequency and harmonics thereof. The composite filter also exhibits a relatively constant delay of about 500 nanoseconds to 1.5 MHz. In the latter regard it is noted that both filter networks 30 and 40 exhibit substantially equal amounts of signal delay so that the signal transit delay times of the I and Q signal processing paths are substantially equal. The frequency bandwidth of I filter network 40 is significantly greater (i.e., three times greater) than that of Q filter network 30. Thus I filter network 40 exhibits a higher order filter configuration relative to that of Q filter 30, in order to provide enough signal delay in the I signal path so that the signal processing delays of the I and Q signal paths are substantially equal.

The amplitude response of the composite filter is relatively "flat" over the low frequency portion of the I signal bandwidth from 0–0.5 MHz, and is peaked over the higher frequency portion of the I signal bandwidth from 0.5 MHz to 1.5 MHz. Such signal peaking suitably compensates for the amplitude loss, in the demodulated I signal, associated with the absence of one of the sidebands in the high frequency portion of the transmitted I signal.

The response indicated by FIG. 2, and in particular the peaked response thereof, results from the manner in which the composite filter is unequally terminated, and from the manner in which the plurality of cascaded inductance-capacitance (LC) resonant sections are arranged, as follows.

Composite filter 40 is unequally terminated at opposite ends (terminals a and b) by means of terminating resistors 41 and 43 of substantially different values. Composite filter network 40 exhibits a DC impedance primarily determined by the sum of the values of terminating resistors 41 and 43. With the values illustrated for these resistors, the filter terminating impedances exhibit a mismatch ratio of 9:1.

The composite filter comprises a plurality of mutually interactive cascaded resonant LC sections $L_1C_1$, $L_2C_2$, $L_3C_3$, $L_4C_4$ and $L_5C_5$. The first section $L_1C_1$ as connected to 200 ohm terminating resistor 41 via terminal a, exhibits an impedance of approximately 207 ohms at a frequency of 1 MHz which corresponds to the midband frequency of the high frequency portion of the I signal bandwidth over which peaking is developed. Thus the impedance of section $L_1C_1$ at 1 MHz substantially matches the impedance of terminating resistor 41. The other end of the composite filter is terminated by an LC section comprising an inductor $L_6$ and capacitor $C_5$, connected via terminal b to higher value terminating resistor 43. This section exhibits an impedance of approximately 1.1 kilohms at a frequency of 1 MHz, which acceptably approximates the 1.8 kilohm value of terminating resistor 43 at this frequency. Acceptable impedance matching between terminal LC sections $L_1C_1$ and $L_6C_5$ and associated terminating resistors 41 and 43 is produced if the impedance exhibited by the respective terminal LC section, at 1 MHz, is not more than twice or less than one-half the value of the associated terminating resistor. Intermediate sections $L_2C_2$, $L_3C_3$, $L_4C_4$ and $L_5C_5$ exhibit progressively increasing impedance values at 1 MHz, i.e., from somewhat above 200 ohms for section $L_2C_2$ to somewhat less than 1.1 kilohms for section $L_5C_5$. The illustrated values for the inductors and capacitors of network 40 were chosen from among normally commercially available standard component values.

In addition, the component values of sections $L_1C_1$, $L_2C_2$, $L_3C_3$, $L_4C_4$ and $L_5C_5$ were chosen to exhibit resonances at 1.5 HMz, 3.1 MHz, 2.1 MHz, 1.7 MHz and 1.0 MHz, respectively. These frequencies correspond to the frequency "poles" of the composite filter, with the higher frequency poles having a progressively higher "Q" (figure of merit) since progressively increasing amplitude peaking is wanted at progressively increasing frequencies, compared to the lower frequency poles at which less peaking is wanted. The lower frequency poles are associated with larger delay and less amplitude peaking, compared with the higher frequency poles which are associated with significantly less delay but a greater amount of amplitude peaking.

The terminating resistors can exhibit a mismatch ratio other than 9:1, e.g., 4:1. However, smaller mismatch ratios result in a smaller amount of amplitude peaking, while excessively large mismatch ratios can result in unwieldy values of inductors and capacitors being required, particularly for the terminal LC sections. Specifically, in the latter case the values of the inductors and capacitors can become sufficiently small and large, respectively, such that the effects of component value tolerances can introduce additional design difficulties.

The DC resistance associated with the series path including inductors $L_1$-$L_6$, between terminals "a" and "b", should be negligible. For example, a resistor of significant value disposed in such series path can undesirably upset the desired peaked low pass response of the filter, such as by damping the amount of amplitude peaking and by introducing other unwanted effects. Inductors $L_1$-$L_6$ should be high "Q" elements with negligibly small DC resistance values of less than 5 ohms, preferably on the order of 1 or 2 ohms. Also, inductors $L_1$-$L_6$ should each exhibit a self-resonant frequency (i.e., with associated parasitic capacitances) significantly above 1.5 MHz, and preferably should not exhibit mutual inductance coupling.

In this embodiment, amplifier transistor 15 in I demodulator network 14 is intended to exhibit a substantially unity DC gain, and an AC gain in accordance with the transfer function of filter network 40 for developing a demodulated I signal voltage across output resistor 16 in accordance with the transfer function of filter network 40. The substantially unity DC gain requirement dictates that the DC impedance presented to the emitter of transistor 15 via terminal B exhibits substantially the same value (2 kilohms) as the DC collector impedance represented by collector resistor 16. This requirement is satisfied by composite filter network 40, which exhibits a DC impedance primarily determined by the sum of the values of terminating resistors 41 and 43. The composite filter additionally provides a DC bias current path from the emitter of transistor 15 to ground via terminal B, resistor 43, inductors $L_1$-$L_6$, and resistor 41.

As will be described in greater detail subsequently, network 40 synthesizes, at interface terminal B, an impedance related to the transfer function of the composite LC filter. Signal currents conducted by the emitter-collector path of amplifier transistor 15 in I demodulator network 14 accordingly exhibit the transfer function of the composite filter, and a corresponding signal voltage developed across output load resistor 16 also exhibits the composite filter transfer function. Thus the demodulated I signal, as applied to the base input of transistor 15, is provided from the output of demodulator network 14 in accordance with the transfer function of the composite I filter.

The recovered I signal provided by demodulator 14 in accordance with the peaked transfer function shown by FIG. 2 suitably compensates for the amplitude loss associated with the absence of one of the sidebands in the high frequency portion of the transmitted I signal. Thus greater use is made of the available information content of the wideband I signal, particularly in the high frequency portion thereof containing information relating to orange and cyan color information. Wide bandwidth (0–1.5 MHz) processing of the I signal in accordance with the disclosed arrangement is particularly advantageous in high definition color television signal processing systems, such as color receivers employing comb filtering techniques for extracting the luminance and chrominance components from the composite color television signal prior to luminance and chrominance processing. With wide bandwidth I demodulation, greater use can be made of the available color information content of the television signal, resulting in improved color picture definition and enhanced subjective color sharpness.

The arrangement of filter network 40 is particularly advantageous since it presents a means by which a high order, two-port, three terminal filter can be connected to associated circuits in the signal path by means of only a single interfacing terminal, e.g., terminal B. This result is desirable when there is only a single terminal (e.g., terminal B) of an integrated circuit (such as comprising circuit 14) available to provide a transfer function of a filter normally requiring both input and output terminals coupled in the signal path. Additional aspects of the operation of filter network 40 will now be described in detail.

Network 40 also includes a substantially unity voltage gain PNP emitter follower transistor 47 with a high impedance base signal input electrode coupled to terminal B via a small (100 ohm) resistor 48, and a low impedance emitter output electrode coupled to filter terminal c. The arrangement of the composite LC filter with transistor 47 causes the collector current of amplifier transistor 15 to exhibit a transfer function H(s) corresponding to the transfer function H(s) of the composite filter. Accordingly, an output signal voltage developed across collector load resistor 16 exhibits the transfer function of the composite filter.

The demodulated I signal voltage developed at the low impedance emitter of transistor 15 appears at terminal B and at the base input of voltage follower transistor 47. Transistor 47 exhibits a substantially unity signal voltage gain (e.g., approximately 0.98), and applies the I signal voltage via the low impedance emitter of transistor 47 to intermediate terminal c of the composite filter. In essence, transistor 47 acts as a second source of signal voltage for application to the composite filter via filter terminal c, the first source of signal voltage corresponding to the emitter of amplifier transistor 15 which is coupled to filter terminal "b" via terminal B and resistor 43.

It is noted that with this arrangement, signal voltages of similar phase and substantially equal magnitude are respectively applied to intermediate filter terminal c, and to resistor 43 which is connected to filter terminal "b" (i.e., a substantially zero signal voltage differential exists between filter terminal c and terminal B). Also, resistor 41 connects filter terminal "a" to a point of fixed potential (ground). Thus filter terminals b and c are excited with input signal voltage whereas filter terminal "a" is not. As a result, the current conducted by resistor 41 varies in accordance with the input signal voltage applied to terminal B, but does not exhibit the transfer function of the composite filter. However, the current conducted by resistor 43 and terminal B exhibits the transfer function of the composite filter. This current corresponds to the collector-emitter current of amplifier transistor 15, and causes load resistor 16 to exhibit a signal voltage having the transfer function of the composite filter.

To better understand the operation of network 40, assume for the moment that the three terminal (a,b,c) composite filter is connected in a conventional configuration. In such case intermediate terminal "c" would be connected to point of fixed reference potential (e.g., ground), and terminal "b" would be connected to ground via resistor 43. Input signals would be applied to terminal "a" via "input" resistor 41, and filtered signals would appear at terminal "b" across "output" resistor 43. In such a conventional filter configuration, terminal "a" alone would be excited with input signals, while terminal c and the end of "output" resistor 43 which is remote from terminal b would both be at a fixed potential relative to input terminal a. The current conducted by "output" resistor 43 would exhibit the transfer function of the three terminal filter. This same result is achieved by the arrangement of network 40, wherein both filter terminals b and c are similarly excited with signals, but filter terminal a is coupled to fixed ground reference potential. Thus the disclosed arrangement of network 40, wherein two of the filter terminals are excited with signals relative to the third terminal which is coupled to a fixed potential, produces a result equivalent to that produced by a conventional three terminal filter configuration wherein only one of the filter terminals is excited with signal relative to the other two terminals which are coupled to fixed potentials.

Network 40 synthesizes, at terminal B, an impedance which is related to (i.e., the reciprocal of) the transfer function of the three-terminal composite filter. The signal current conducted by resistor 43, terminal B and the collector-emitter path of transistor 15 corresponds to the product of the I signal voltage at the emitter of transistor 15 and the transfer function of the composite filter. In this regard it is noted that the emitter signal voltage of transistor 15 substantially corresponds to the base signal voltage of transistor 15, but the emitter and collector signal currents of transistor 15 exhibit the composite filter transfer function.

What is claimed is:

1. In a video signal processing system including a signal path for conveying video signals, frequency selective apparatus coupled to said signal path for imparting a given amplitude-versus-frequency response, including a peaked amplitude response over a peaking frequency range, to signals conveyed by said signal path, comprising:
   a first resonant section comprising an inductance and capacitance;
   a second resonant section arranged in cascade with said first section and comprising an inductance and capacitance;
   an intermediate resonant section coupled between and arranged in cascade with said first and second sections and comprising an inductance and capacitance;
   a first resistor for terminating said first section;
   a second resistor for terminating said second section; wherein
   said first and second terminating resistors exhibit substantially different values;
   said first resonant section presents to said first resistor an impedance which approximates the value of said first resistor, at a frequency within said peaking frequency range;
   said second resonant section presents to said second resistor an impedance which approximates the value of said second resistor, at a frequency within said peaking frequency range; and
   said frequency selectivve apparatus presents a DC impedance to said signal path primarily determined by the values of said first and second terminating resistors.

2. Apparatus according to claim 1, wherein
   said first, second and intermediate resonant sections are mutually interactive to produce said given frequency response including amplitude peaking.

3. Apparatus according to claim 1, wherein
   said intermediate resonant section exhibits an impedance, at a frequency within said peaking frequency range, intermediate to the impedances presented by said first and second resonant sections within said peaking frequency range.

4. Apparatus according to claim 1, wherein
   said intermediate resonant section comprises plural cascaded inductance-capacitance sections; and
   said plural cascaded intermediate resonant sections respectively exhibit, at frequencies within said peaking frequency range, progressively increasing impedance values between the impedance values presented by said first and second resonant sections within said peaking frequency range.

5. Apparatus according to claim 4, wherein
   said impedances respectively presented by said first, second and intermediate resonant sections are developed at a frequency situated substantially midrange with respect to said peaking frequency range.

6. Apparatus according to claim 1, wherein
   said frequency selective apparatus comprises a low pass filter with plural cascaded inductors and plural capacitors respectively associated with and coupled in shunt with said plural inductors.

7. Apparatus according to claim 6, wherein
   said filter is coupled in shunt with said signal path and provides a direct current path from said signal path to a reference potential.

8. Apparatus according to claim 1, wherein
   said frequency selective apparatus comprising said first, second and intermediate resonant sections comprises a high order composite filter of the type having three terminals and two signal ports, and exhibiting a composite amplitude-versus-frequency transfer function between said two signal ports corresponding to the aggregate transfer functions of said first, second and intermediate resonant sections; and
   said composite filter is coupled via a single interface terminal to said signal path to effect translation of signals conveyed by said signal path in accordance with said composite transfer function.

9. Apparatus according to claim 8 and further comprising:
   means coupled to said composite filter for synthesizing, at said single interface terminal, an impedance related to the transfer function of said composite filter.

10. Apparatus according to claim 1, wherein
    said frequency selective apparatus comprises a composite electrical signal filter including said first, second and intermediate resonant sections, of the type comprising a first terminal corresponding to a signal port associated with said first resonant section, a second terminal corresponding to a signal port associated with said second resonant section, and a third terminal coupled to said first and second sections; said composite filter exhibiting a transfer function between said first and second terminals;
    first means for coupling signals from said signal path to said first filter terminal;
    second means for coupling said second filter terminal to a reference potential; and
    third means for coupling signals from said signal path to said third terminal.

11. Apparatus according to claim 10, wherein said first and third coupling means include respective signal voltage sources for separately exciting said first and third filter terminals.

12. Apparatus according to claim 11, wherein said first resistor couples a signal voltage to said first filter terminal; and
signal voltages applied to said first resistor and to said third filter terminal exhibit similar phase and substantially equal magnitude.

13. In a system for processing a color television signal including a chrominance information component exhibiting a first amplitude level over a first frequency range and a second amplitude level lower than said first amplitude level over a second frequency range, frequency selective apparatus for imparting to said chrominance component a given amplitude-versus-frequency response including a peaked amplitude response over said second frequency range, comprising:
   a first resonant section comprising an inductance and capacitance;
   a second resonant section arranged in cascade with said first section and comprising an inductance and capacitance;
   an intermediate resonant section coupled between and arranged in cascade with said first and second sections and comprising an inductance and capacitance;
   a first resistor for terminating said first section;
   a second resistor for terminating said second section; wherein
   said first and second terminating resistors exhibit substantially different values;
   said first resonant section presents to said first resistor an impedance which approximates the value of said first resistor, at a frequency within said second frequency range;
   said second resonant section presents to said second resistor an impedance which approximates the value of said second resistor, at a frequency within said second frequency range; and
   said frequency selective apparatus presents a DC impedance to said signal path primarily determined by the values of said first and second terminating resistors.

14. Apparatus according to claim 13, wherein said processing system comprises a color television receiver including:
   means for receiving a composite color television signal including a chrominance subcarrier signal containing chrominance modulation information in double sideband form over said first frequency range, and chrominance modulation information in single sideband form over a higher frequency range corresponding to said second frequency range;
   means for synchronously detecting sad modulated chrominance component to produce said chrominance information component having said first and second amplitude levels over said first and second frequency ranges; and wherein
   said frequency selective apparatus filters output signals from said synchronous detecting means.

15. Apparatus according to claim 13, wherein said first, second and intermediate resonant sections are mutually interactive to produce said given frequency response including amplitude peaking.

16. Apparatus according to claim 13, wherein said intermediate resonant section exhibits an impedance, at a frequency within said second frequency range, intermediate to the impedances presented by said first and second resonant sections within said second frequency range.

17. Apparatus according to claim 13, wherein
said intermediate resonant section comprises plural cascaded inductance-capacitance sections; and
said plural cascaded intermediate resonant sections respectively exhibit, at frequencies within said second frequency range, progressively increasing impedance values between the impedance values presented by said first and second resonant sections within said second frequency range.

18. Apparatus according to claim 17, wherein
said impedances respectively presented by said first, second and intermediate resonant sections are developed at a frequency situated substantially midrange with respect to said second frequency range.

19. Apparatus according to claim 13, wherein
said frequency selective apparatus comprises a low pass filter with plural cascaded inductors and plural capacitors respectively associated with and coupled in shunt with said plural inductors.

20. In a signal processing system including a signal path for conveying signals to be translated, said signal path including an amplifier device for receiving input signals to be translated and having an output load resistance, apparatus comprising:
   a frequency selective network including
      a first resonant section comprising an inductance and capacitance;
      a second resonant section arranged in cascade with said first section and comprising an inductance and capacitance;
      an intermediate resonant section coupled between and arranged in cascade with said first and second sections and comprising an inductance and capacitance;
      a first resistor for terminating said first section; and
      a second resistor for terminating said second section;
   means for coupling said frequency selective network in series with the main current conduction path of said amplifier device;
   means for exciting said frequency selective network with signals from said signal path; wherein
   said first and second terminating resistors exhibit substantially different values;
   said first resonant section presents to said first resistor an impedance which approximates the value of said first resistor, at a frequency within said peaking frequency range;
   said second resonant section presents to said second resistor an impedance which approximates the value of said second resistor, at a frequency within said peaking frequency range; and
   the DC gain of said amplifier device is primarily determined by the ratio of the value of said load resistance to the combined values of said first and second terminating resistors.

* * * * *